United States Patent Office 3,027,408
Patented Mar. 27, 1962

3,027,408
2-(BENZYLCARBAMYL)-ETHYL SUBSTITUTED OXALIC ACID HYDRAZIDE
Jacob Szmuszkovicz, Portage Township, Kalamazoo County, Mich., assignor to The Upjohn Company, Kalamazoo, Mich., a corporation of Delaware
No Drawing. Filed Mar. 18, 1960, Ser. No. 15,806
9 Claims. (Cl. 260—562)

This invention relates to novel compounds, and to a process for preparing them. It is more particularly directed to 2-[2-(benzylcarbamyl)ethyl]hydrazides of oxalic acid and to a novel intermediate, and to a process for preparing them. The compounds of the invention have the following general structural formula

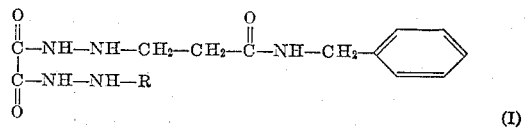

(I)

wherein R is selected from the group consisting of hydrogen and the 2-(benzylcarbamyl)ethyl radical. They are prepared by reacting the novel intermediate of the invention, [2-(benzylcarbamyl)ethyl]hydrazine, with, respectively, a di-lower-alkyl oxalate or a mono-lower-alkyl oxalate hydrazide. Wherever used herein, lower-alkyl should be understood to represent alkyl radicals containing not more than eight carbon atoms, for example, methyl, ethyl, propyl, butyl, amyl, hexyl, heptyl, octyl, and isomeric forms thereof.

The aforesaid novel intermediate is prepared by reacting N-benzylacrylamide with hydrazine, preferably in the form of its hydrate. The reaction involves equimolar amount of these reactants, but generally speaking it is preferred to employ an excess of hydrazine, say at least about two times the stoichiometric amount, in order to enhance the yield and purity of the [2-(benzylcarbamyl)ethyl]hydrazine product. A preferred range is between about 2.5 and 3.5 moles of hydrazine for each mole of N-benzylacrylamide; larger amounts of hydrazine can be used but are generally unnecessary. The reactants are mixed in an inert organic solvent, illustratively, a lower alkanol (for example, methanol, ethanol, propanol, and the like), dimethylformamide, and the like. The reaction is carried out at temperatures ranging between about 0° and 30° C., preferably in the range of about 15° to 30° C. The resulting [2-(benzylcarbamyl)ethyl]hydrazine can be recovered and purified if so desired. Alternatively, the reaction mixture can be utilized for further reaction with a di-lower-alkyl oxalate or mono-lower-alkyl oxalate hydrazide, as more fully described below, to prepare a compound of the invention having Formula I above.

When oxalic acid bis{2-[2-(benzylcarbamyl)ethyl]hydrazide} is desired, i.e., the compound of Formula I in which R is a 2-(benzylcarbamyl)ethyl radical, the [2-(benzylcarbamyl)ethyl]hydrazine is reacted with a di-lower-alkyl oxalate, for example, dimethyl oxalate, diethyl oxalate, dibutyl oxalate, and the like. When oxalic acid hydrazide 2-[2-(benzylcarbamyl)ethyl]hydrazide is desired, i.e., the compound of Formula I in which R is hydrogen, a mono-lower-alkyl oxalate hydrazide, for example, monomethyl (or monoethyl)oxalate hydrazide, is reacted with the [2-(benzylcarbamyl)ethyl]hydrazine. The reactants are mixed for reaction purposes in an inert organic solvent, illustratively, a lower alkanol (for example, methanol, ethanol, propanol, and the like), dimethylformamide, and the like. Stoichiometrically, the reaction of [2-(benzylcarbamyl)ethyl]hydrazine with a di-lower-alkyl oxalate requires 1 mole of the latter for each 2 moles of the former; that with a mono-lower-alkyl oxalate hydrazide requires equimolar proportions. The reactants can be employed in stoichiometric proportions, or an excess of either reactant can be employed if so desired. When the [2-(benzylcarbamyl)ethyl]hydrazine is utilized without separation from a reaction mixture in which it is prepared, and said reaction mixture contains unreacted hydrazine, as in Examples 1 and 2 below, it is preferred that enough excess di-lower-alkyl oxalate or mono-lower-alkyl oxalate hydrazide be employed to react with the hydrazine. The resulting oxalic acid bishydrazide can be readily separated from the desired compound of Formula I by virtue of differential solubility. The reaction is carried out at temperatures ranging between about 0° and 30° C., preferably in the range of about 15° to 30° C. The reaction is exothermic, so that cooling means are sometimes needed to maintain the reaction temperature within the desired range. In a preferred embodiment of the process of the invention, a solution of di-lower-alkyl oxalate or mono-lower-alkyl oxalate hydrazide in an inert solvent of the kind illustrated above is added to a stirred solution of [2-(benzylcarbamyl)ethyl]hydrazine in an inert solvent of the kind illustrated above, maintaining the temperature of the reaction mixture between about 15° and 30° C. during the addition and for about ¼ to 3 hrs. thereafter. The reaction mixture is then maintained between about 50° and 100° C. for about ½ to 3 hrs. in order to insure completeness of reaction.

When the reaction has been completed, the compound of Formula I, formed during the reaction, it is recovered in a conventional manner, e.g., by crystallization from the reaction mixture. If desired, it is separated from by-products such as oxalic acid bishydrazide as noted above, and further purified, e.g., by recrystallization from a solvent such as water or aqueus ethanol.

The novel oxalic acid bis{2-[2-(benzylcarbamyl)ethyl] hydrazide} and oxalic acid hydrazide 2-[2-(benzylcarbamyl)ethyl]hydrazide of this invention are monoamine oxidase inhibitors and are useful for inhibiting this enzyme in animals and in laboratory processes. Thus the compounds of the invention can be used in a research laboratory to inhibit, selectively, monoamine oxidase in mixed enzyme systems. They can also be used in the characterization and quantitative determination of monoamine oxidase activity in the laboratory. They are also useful in the treatment of mental disease, such as mental depression, where psychic energization is desired.

When used in therapy, especially in mammals, the novel compounds of the invention can be combined with solid or liquid pharmaceutical carriers and formulated in the form of tablets, powder packets, or capsules, using starch and like excipients. The compounds can also be dissolved or suspended in suitable solvents or vehicles, for oral or parenteral administration.

The following examples are illustrative of the process and products of the present invention, but are not to be construed as limiting.

*Example 1.—Oxalic Acid Bis{2-[2-(Benzylcarbamyl)-Ethyl]Hydrazide}*

A quantity (8.1 g., 0.05 mole) of solid N-benzylacrylamide (German Patent 752,841) was added with stirring during a 10-min. interval to a solution of hydrazine hydrate (7.5 g., 0.15 mole) in 25 ml. of absolute ethanol, the temperature of the mixture being maintained at about 20° to 25° C. Stirring was continued for 2 hrs., and then a solution of diethyl oxalate (11 g., 0.075 mole) in 75 ml. of absolute ethanol was added during a 10-min. interval with intermittent cooling in an ice-bath in order to maintain the reaction temperature at about 20° to 25° C. The resulting suspension was stirred at the same temperature for 2 hrs., and then refluxed for ½ hr.

After cooling the suspension to about 25° C., the solids were recovered on a filter, and the filter cake was washed with absolute ethanol; dry weight of cake, 10.0 g. A second crop weighing 0.9 g. was obtained. The filter cakes were combined, comminuted, and added to 1 liter of absolute ethanol, and the suspension thus produced was refluxed for 1 hr. This suspension was filtered while hot in order to remove oxalic acid bishydrazide and the filtrate was concentrated to about 300 ml. by evaporating the ethanol on a steam-bath. After cooling the concentrate to aboute 25° C. and holding it overnight, 4.9 g. of solid product was obtained by filtration. Recrystallization from 1050 ml. of water gave 1.6 g. of needles (in clusters) having a melting point of 215° to 217.5° C. A second recrystallization from 1100 ml. of water yielded 1.5 g. of purified oxalic acid bis{2-[2-(benzylcarbamyl)ethyl]hydrazide} having a melting point of 216.5° to 218° C.

*Analysis.*—Calcd. for $C_{22}H_{28}N_6O_4$: C, 59.98; H, 6.41; N, 19.08. Found: C, 59.76, 59.98; H, 6.60, 6.54; N, 19.13, 19.32.

*Example 2.—Oxalic Acid Hydrazide 2-[2-(Benzylcarbamyl)Ethyl]Hydrazide*

A quantity (8.1 g., 0.05 mole) of solid N-benzylacrylamide was added to a stirred solution of hydrazine hydrate (7.5 g., 0.15 mole) in 25 ml. of absolute ethanol over an interval of 10 min., the temperature of the mixture being maintained at about 20° to 25° C. The resulting solution was then stirred for 3 hrs., and a warm solution of monomethyl oxalate hydrazide (17.7 g., 0.15 mole) in 200 ml. of absolute ethanol was added during 5 min. with intermittent cooling in an ice-bath in order to maintain the reaction temperature at about 20° to 25° C. [The preparation of monomethyl oxalate hydrazide is described by Tierie, Rec. trav. chim. 52, 357–65 (1933).] The resulting suspension was stirred at the same temperature for 15 min., and then refluxed for ½ hr. The reaction mixture was cooled to about 25° C. and allowed to stand overnight, and it was then filtered. The filter cake was washed with absolute ethanol; dry weight of cake, 18.6 g. The cake was comminuted and added to 1 liter of absolute ethanol, and the suspension thus produced was refluxed for 1 hr. This suspension was filtered while hot in order to remove oxalic acid bishydrazide and the filtrate was concentrated to about 300 ml. by evaporating the ethanol on a steam-bath. The concentrate was cooled to about 25° C. and held overnight for crystallization. Oxalic acid hydrazide 2-[2-(benzylcarbamyl)ethyl]hydrazide (5.5 g.) having a melting point of 175° to 178° C. was thus obtained. On recrystallization from 50 ml. of water, 5 g. of the purified compound having a melting point of 180° to 183° C. was obtained.

*Analysis.*—Calcd. for $C_{12}H_{17}N_5O_3$: C, 51.60; H, 6.14; N, 25.08. Found: C, 51.29; H, 5.95; N, 24.92.

*Example 3.—[2-(Benzylcarbamyl)Ethyl]Hydrazide*

A quantity (8.1 g., 0.05 mole) of solid N-benzylacrylamide was added with stirring during a 10-min. interval to a solution of hydrazine hydrate (7.5 g., 0.15 mole) in 25 ml. of absolute ethanol, the temperature of the mixture being maintained at about 20° to 25° C. Stirring was continued for 2 hrs. The reaction mixture was evaporated to dryness at about 25° C. and under reduced pressure, to obtain [2-(benzylcarbamyl)ethyl]hydrazine as a residue.

I claim:
1. Compound having the following structural formula

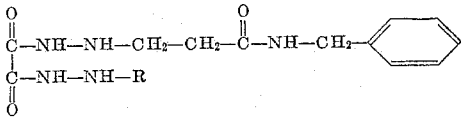

wherein R is selected from the group consisting of hydrogen and the 2-(benzylcarbamyl)ethyl radical.

2. Oxalic acid bis{2-[2-(benzylcarbamyl)ethyl]hydrazide}.

3. Oxalic acid hydrazide 2-[2-(benzylcarbamyl)ethyl]hydrazide.

4. [2-(benzylcarbamyl)ethyl]hydrazine.

5. The process which comprises reacting N-benzylacrylamide with hydrazine in the presence of an inert solvent and at a temperature of about 0° to 30° C. to produce [2-(benzylcarbamyl)ethyl]hydrazine, and reacting the thus-produced [2-(benzylcarbamyl)ethyl]hydrazine with a compound selected from the class consisting of di-lower-alkyl oxalate and mono-lower-alkyl oxalate hydrazide to produce oxalic acid bis{2-[2-(benzylcarbamyl)ethyl]hydrazide} and oxalic acid hydrazide 2-[2-(benzylcarbamyl)ethyl]hydrazide, respectively.

6. The process which comprises reacting N-benzylacrylamide with hydrazine in the presence of an inert solvent at a temperature of about 0° C. to 30° C. to produce [2-(benzylcarbamyl)ethyl]hydrazine.

7. The process which comprises reacting [2-(benzylcarbamyl)ethyl]hydrazine with a compound selected from the class consisting of di-lower-alkyl oxalate and mono-lower-alkyl oxalate hydrazide to produce oxalic acid bis{2-[2-(benzylcarbamyl)ethyl]hydrazide} and oxalic acid hydrazide 2-[2-(benzylcarbamyl)ethyl]hydrazide, respectively.

8. The process which comprises reacting N-benzylacrylamide with hydrazine hydrate in the presence of an inert solvent and at a temperature of about 0° to 30° C. to produce [2-(benzylcarbamyl)ethyl]hydrazine, and reacting the thus-produced [2-(benzylcarbamyl)ethyl]hydrazine with diethyl oxalate in the presence of ethanol to produce oxalic acid bis{2-[2-(benzylcarbamyl)ethyl]hydrazide}.

9. The process which comprises reacting N-benzylacrylamide with hydrazine hydrate in the presence of an inert solvent and at a temperature of about 0° to 30° C. to produce [2-(benzylcarbamyl)ethyl]hydrazine, and reacting the thus-produced [2-(benzylcarbamyl)ethyl]hydrazine with monomethyl oxalate hydrazide to produce oxalic acid hydrazide 2-[2-(benzylcarbamyl)ethyl]hydrazide.

References Cited in the file of this patent

UNITED STATES PATENTS 2,835,703     Caldwell et al.            May 20, 1958

OTHER REFERENCES

Muller et al.: Annalen der Chemie, vol. 475, pages 120–31 (1929).

Tierie: Recueil des Travaux Chimiques, vol. 52, pages 357–365 (1933).

Byrkit et al.: Industrial and Engineering Chemistry, vol. 42, pages 1862–1875 (1950).